United States Patent
Hafner et al.

(10) Patent No.: US 7,404,911 B2
(45) Date of Patent: Jul. 29, 2008

(54) HEAT-TRANSFER MEDIA HAVING IMPROVED THERMAL STABILITY AND BASED ON HIGHER POLYGLYCOLS

(75) Inventors: Markus Hafner, Oberroth (DE); Achim Stankowiak, Altoetting (DE); Johann Schuster, Kastl (DE); Stefan Mauerberger, Altoetting (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 11/701,773

(22) Filed: Feb. 2, 2007

(65) Prior Publication Data

US 2007/0181849 A1  Aug. 9, 2007

(30) Foreign Application Priority Data

Feb. 3, 2006 (DE) .................. 10 2006 004 895

(51) Int. Cl.
- C09K 5/10 (2006.01)
- C09K 5/00 (2006.01)
- C09K 5/08 (2006.01)
- C09K 3/18 (2006.01)

(52) U.S. Cl. ............... 252/73; 106/13; 62/118; 62/235.1; 126/910; 165/104.19; 165/104.28; 165/104.31; 252/70; 252/71; 252/74; 252/75; 252/76; 252/77; 252/78.1; 252/79

(58) Field of Classification Search ........... 252/70, 252/71, 74, 75, 76, 77, 78.1, 79, 73; 106/13; 62/118, 235.1; 126/910; 165/104.19, 104.28, 165/104.31
See application file for complete search history.

(56) References Cited

U.S. PATENT DOCUMENTS

| | | | |
|---|---|---|---|
| 4,210,549 A * | 7/1980 | Hirozawa et al. | 252/76 |
| 4,455,248 A * | 6/1984 | Wood | 252/75 |
| 4,758,367 A * | 7/1988 | George | 252/75 |
| 5,595,678 A | 1/1997 | Short | |
| 5,741,436 A * | 4/1998 | Gershun et al. | 252/76 |
| 6,093,341 A | 7/2000 | Minks | |
| 2006/0033076 A1* | 2/2006 | Hafner et al. | 252/75 |

FOREIGN PATENT DOCUMENTS

| | | |
|---|---|---|
| AT | 206414 B | 11/1959 |
| DE | 219033 A3 | 2/1985 |
| DE | 195 25 090 | 1/1997 |
| EP | 0025011 | 3/1981 |
| JP | 4-279690 A * | 10/1990 |
| RU | 2125074 C1 * | 1/1999 |

OTHER PUBLICATIONS

English Language Abstract of DE 195 25 090, Jan. 16, 1997.
Korrosionsuntersuchungen in Waermetraegern fuer Solaranlagen, Arbeitsgemeinschaft Korrosion E.V., (1988) p. 297-304, vol. 39, Germany.
Hillerns, F., et al., Korrosionsschutz und Thermische Belastbarkeit, Solarwaerme, (May 1999) pp. 25-27, Germany.
German Patent Office Action for corresponding Application DE102006004895.4, issued Dec. 22, 2006.
English Language Abstract for DD 219033 A3, Feb. 20, 1985.
English Language Abstract for AT 206414 B, Nov. 25, 1959.
EP Office Action for corres. Application No. EP 07001110.1, Mar. 19, 2007.
English Language Machine Translation of EP 0025011, published on Mar. 11, 1981 (Abstract, Description and Claims).
English Language Machine Translation of DE 19525090, published Jan. 16, 1997 (Decsription and Claims).

* cited by examiner

Primary Examiner—Anthony J. Green
(74) Attorney, Agent, or Firm—Richard P. Silverman

(57) ABSTRACT

The present invention relates to heat-transfer concentrates for solar installations, containing a) from 92 to 99% by weight of at least one polyglycol of the formula R—O—(CH$_2$—CH$_2$—O)$_n$—H, in which n is an integer of from 3 to 500 and R is H, a C$_1$- to C$_4$-alkyl group or an aromatic radical having 6 to 12 carbon atoms, b) from 1 to 8% by weight of at least one corrosion inhibitor, with the proviso that its content of ethylene glycol and 1,2-propylene glycol is less than 0.2% by weight.

8 Claims, No Drawings

HEAT-TRANSFER MEDIA HAVING IMPROVED THERMAL STABILITY AND BASED ON HIGHER POLYGLYCOLS

The present invention relates to novel heat-transfer media based on higher polyglycols. The heat-transfer media according to the invention have improved high-temperature stability and hence a longer life compared with conventional heat-transfer media based on monoethylene glycol and/or 1,2-propylene glycol.

The field of use for the novel heat-transfer media includes technical installations for transporting heat or cold, in particular thermal solar installations which are subject to particular thermal stress. For this special application, this applies both to flat collectors and to vacuum tube collectors.

Through the use of more efficiently operating collector coatings, the peak temperatures in thermal solar installations continue to increase. This is a problem particularly in the stagnation state of thermal solar installations because the circulation pump switches off automatically in many designs, which results in overheating of the solar liquid.

In the case of the widely used flat collectors, this gives rise to peak temperature values around 200° C.; in the case of the vacuum tube collectors which are subject to higher thermal loads, even up to 300° C. are measured. While the lives of the heat-transfer media based on monoethylene glycol and/or 1,2-propylene glycol are insufficient even when used in flat collectors, the use of such heat-transfer media in vacuum tube collectors gives rise to considerable problems which are due in particular to the thermal oxidative instability of monoethylene glycol or propylene glycol.

The thermal decomposition of monoethylene glycol and 1,2-propylene glycol results, inter alia, in the formation of aggressive acids (e.g. formic, lactic and acetic acid) and poorly characterizable cleavage products as degradation products. A relevant description is to be found in the Arbeitsblatt der Arbeitsgemeinschaft Korrosion e.V., Korrosionuntersuchungen in Wärmeträgern für Solaranlagen, [Corrosion investigations in heat-transfer media for solar installations], Werkstoffe und Korrosion, 39, 297-304 (1988).

The resulting degradation products have an adverse effect in the collector loop. As a result of further action of heat in the stagnation state, the residues burn into the absorber surface. In the extreme case, the residues can even lead to complete blockage of the collector pipes and hence to stoppage of the circulation.

This problem was already described in DE-A-195 25 090. By adding a relatively high molecular weight polyalkylene glycol in the mass range of from 195-400 in a concentration of 10-40% to 1,2-propylene glycol, it was intended to prevent dissolved corrosion inhibitors from crystallizing out. This concentrate was mixed appropriately with water in order to optimize the heat transfer.

EP-A-0 971 013 discloses a heat-transfer liquid containing a mixture of corrosion inhibitors, triethylene glycol and 1,2-propylene glycol. Here, the proportion of triethylene glycol is from 45 to 98% and that of propylene glycol from 1 to 55%. The advantage of this heat-transfer medium is that the low molecular weight glycols improve the solution properties of the additives and hence their crystallization behavior at high temperatures.

However, it had been emerged that, in the case of heat-transfer media of the prior art, thermal oxidative decomposition of ethylene glycol and 1,2-propylene glycol still occurs.

It was therefore an object of the present invention to improve the thermal stability of the heat-transfer liquids so that decomposition of the heat-transfer medium does not occur even in the stagnation state of solar installations.

Surprisingly, it has now been found that heat-transfer media based on higher polyglycols have significantly higher thermal stability than the heat-transfer media based on pure 1,2-propylene glycol or mixtures of triethylene glycol and 1,2-propylene glycol.

The invention therefore relates to heat-transfer concentrates for solar installations, containing
a) from 92 to 99% by weight of at least one polyglycol of the formula R—O—(CH$_2$—CH$_2$—O)$_n$—H, in which n is an integer from 3 to 500 and R is H, a C$_1$- to C$_4$-alkyl group or an aromatic radical having 6 to 12 carbon atoms,
b) from 1 to 8% by weight of at least one corrosion inhibitor, with the proviso that their content of ethylene glycol and 1,2-propylene glycol is less than 0.2% by weight.

The invention furthermore relates to a method for operating a solar installation, the heat-transfer concentrate described above being used in aqueous dilution as a heat-transfer medium.

The invention furthermore relates to the use of the heat-transfer concentrate described above in aqueous dilution as the heat-transfer medium is solar installations.

n is preferably an integer from 3 to 20.

R is preferably H, methyl or an optionally substituted phenyl radical.

The portion of the glycol, based on the heat-transfer concentrate, is preferably from 93 to 98% by weight, in particular from 94 to 96% by weight.

In a further preferred embodiment of the invention, the polyglycol is a mixture of triethylene glycol and tetraethylene glycol in the mixing ratio of from 3:1 to 1:3.

The content of ethylene glycol and 1,2-propylene glycol in the heat-transfer concentrate according to the invention is preferably less than 0.1% by weight, in particular less than 0.05% by weight.

The ready-to-use heat-transfer medium according to the invention is formed by mixing the heat-transfer concentrate according to the invention with water. The preferred mixing ratio is from 30 to 70% by weight, particularly preferably from 45 to 55% by weight, of water and from 70 to 30, particularly preferably from 55 to 45, % by weight of the heat-transfer concentrate according to the invention.

Particularly preferred embodiments of the invention are ready-to-use heat-transfer media containing
a) from 45 to 55% by weight of at least one polyglycol of the formula R—O—(CH$_2$—CH$_2$—O)$_n$—H, in which n is an integer of from 3 to 500 and R is H, a C$_1$- to C$_4$-alkyl group or an aromatic radical having 6 to 12 carbon atoms,
b) from 1 to 4% by weight of at least one corrosion inhibitor and
c) from 45 to 55% by weight of water, in particular
a) from 45 to 55% by weight of triethylene glycol,
b) from 1 to 4% by weight of at least one corrosion inhibitor and
c) from 45 to 55% by weight of water, with the proviso that their content of ethylene glycol and 1,2-propylene glycol is less than 0.1% by weight.

Corrosion inhibitors which may be used in the heat-transfer concentrate and in the ready-to-use heat-transfer medium are, for example, borates, silicates, amines, triazoles or thiazoles, molybdates, acid amides, nitrates, sodium benzoate and salts of mono-, di- and tricarboxylic acids and other corrosion inhibitors known from the literature, in the concentrate preferably in amounts of 2 to 7% by weight. The preferred concentration of the corrosion inhibitors is from 1 to 4% by weight, based on the ready-to-use heat-transfer medium.

Furthermore, the addition of an antioxidant is possible.

EXAMPLES

TABLE 1

Thermal oxidative degradation of various glycols, determined by DTA (differential thermal analysis; 50 ml of air, sample weight about 20 ± 5 mg, heating rate 2° C./min.)

| Duration to degradation of glycol by ... | 1,2-propylene glycol | Monoethylene glycol | Triethylene glycol | Polyglycol VP 1962* |
|---|---|---|---|---|
| ... 10% of the sample weight | 7 min. | 8 min. | 14 min. | 59 min. |
| ... 50% of the sample weight | 11 min. | 12 min. | 19 min. | — (>test duration) |

*= adduct of 14 EO units with resorcinol

The determination of the thermal stability by DTA (table 1) clearly shows that the thermal oxidative degradation of 1,2-propylene glycol proceeds more rapidly than in the case of triethylene glycol. In this investigation, polyglycol VP 1962 is found to be particularly thermally stable.

The following heat-transfer media were prepared for the determination of their thermal stability.

TABLE 2

Heat-transfer compositions

|  | Example 1 (comparison) | Example 2 (comparison) | Example 3 (comparison) | Example 4 | Example 5 |
|---|---|---|---|---|---|
| Demineralized water | 48.6 | 48.6 | 48.6 | 48.6 | 48.6 |
| 1,2-propylene glycol | 50.0 | 25.0 | 3.0 | — | — |
| Triethylene glycol, high-boiling | — | 25.0 | 47.0 | 50.0 | — |
| Resorcinol + 14 EO | — | — | — | — | 50.0 |
| Sodium 2-ethylhexanoate | 1.0 | 1.0 | 1.0 | 1.0 | 1.0 |
| DIPA | 0.10 | 0.10 | 0.10 | 0.10 | 0.10 |
| Benzotriazole | 0.05 | 0.05 | 0.05 | 0.05 | 0.05 |
| Sodium benzoate | 0.25 | 0.25 | 0.25 | 0.25 | 0.25 |
| Total: | 100.0% | 100.0% | 100.0% | 100.0% | 100.0% |

An accelerated test was developed for simulating the conditions in a solar installation (thermal test).

300 ml of test liquid are introduced into a double-walled stainless steel storage container (simultaneously served as a cooler). A pump transports the medium in a closed circulation at a flow rate of 260 l/h over a copper test disk which is electrically heated from below at about 950 watts. A valve which is controlled by means of a process control system and stops the flow at 160° C. is installed between pump and heater. As a result, the test liquid is vaporized. At 330° C., the valve opens, liquid is transported again over the test disk and this is cooled as a result. On reaching the closing temperature of 160° C., a new cycle begins. The test pressure is not more than 6 bar gage pressure. The test time is 72 hours. For safety, the test apparatus is protected by means of a flow safety device and temperature limitation by means of a process control system and a safety valve at a set pressure of 10 bar.

In this accelerated test, it is found that a heat-transfer medium based on higher polyglycols is significantly more stable than a heat-transfer medium based on propylene glycol. In the case of the heat-transfer medium according to example 3, in total far less corresponding acids form than in the case of comparative examples 1 and 2. Furthermore, the reserve alkalinity in the medium decreases less rapidly during the experiment.

The chemical compositions of the heat-transfer liquids are shown in table 2. Example 3 corresponds to the formulation having a composition according to the invention.

TABLE 3

Results of the thermal test

|  | Decrease in reserve alkalinity [%] | Amounts of acids formed after experiment [%] | | |
|---|---|---|---|---|
|  |  | Formic acid | Lactic acid | Acetic acid |
| Example 1 | 34 | 0.071 | 0.008 | 0.490 |
| Example 2 | 25 | 0.009 | 0.069 | 0.047 |
| Example 3 | 45 | 0.003 | 0.016 | 0.015 |
| Example 4 | 21 | 0.001 | 0.001 | 0.001 |
| Example 5 | 19 | 0.001 | 0.001 | 0.001 |

It is clear from the comparative examples shown that heat-transfer media exclusively based on higher polyglycols have greater stability to thermal oxidation than heat-transfer media based on pure propylene glycol or based on triethylene glycol/propylene glycol mixtures.

The invention claimed is:

1. A heat-transfer concentrate containing
   a) from 92 to 99% by weight of a mixture of triethylene glycol and tetraethylene glycol in a mixing ratio of from 3:1 to 1:3,
   b) from 1 to 8% by weight of at least one corrosion inhibitor, with the proviso that said concentrate has less than 0.2% by weight of ethylene glycol and 1,2-propolene glycol.

2. The heat-transfer concentrate of claim 1, wherein the at least one corrosion inhibitor is selected from the group consisting of borates, silicates, amines, triazoles, thiazoles, molybdates, nitrates, sodium benzoate, and a salt of a mono-, di- or tricarboxylic acid.

3. The heat-transfer concentrate of claim 1, wherein the corrosion inhibitor ranges from 2 to 7% by weight of said concentrate.

4. The heat-transfer concentrate of claim 1, wherein the mixture ranges from 94 to 98% by weight of said concentrate.

5. The heat-transfer concentrate of claim 1, wherein ethylene glycol and 1,2-propylene glycol is less than 0.1% by weight of said concentrate.

6. A heat-transfer medium for solar installations, containing from 30 to 70% by weight of the heat-transfer concentrate of claim 1 and water to 100% by weight.

7. The heat-transfer medium of claim 6, wherein said heat-transfer medium contains:
   a) 45 to 55% by weight of the mixture of triethylene glycol and tetraethylene glycol in a mixing ratio of from 3:1 to 1:3,
   b) 1 to 4% by weight of the at least one corrosion inhibitor, and
   c) 45 to 55% by weight of water
with the proviso that said concentrate has less than 0.1% by weight of ethylene glycol and 1,2-propylene glycol.

8. A method for transporting heat or cold in a thermal solar installation, said method comprising circulating a heat-transfer medium in said thermal solar installation, wherein the heat-transfer medium contains a heat-transfer concentrate and water, said heat-transfer medium consisting of
   a) from 45 to 55% by weight of a mixture of triethylene glycol and tetraethylene glycol in a mixing ratio of from 3:1 to 1:3,
   b) from 1 to 4% by weight of at least one corrosion inhibitor and
   c) from 45 to 55% by weight of water,
wherein said heat-transfer concentrate has less than 0.2% by weight of ethylene glycol and 1,2-propylene glycol.

* * * * *